United States Patent
Ogawa et al.

[11] Patent Number: 5,568,321
[45] Date of Patent: Oct. 22, 1996

[54] ZOOM LENS

[75] Inventors: Hideki Ogawa, Chofu; Tsunefumi Tanaka; Takeshi Koyama, both of Yokohama, all of Japan

[73] Assignee: Canon Kabushiki Kaisha, Tokyo, Japan

[21] Appl. No.: 104,943

[22] Filed: Aug. 12, 1993

Related U.S. Application Data

[63] Continuation of Ser. No. 792,157, Nov. 14, 1991, abandoned.

[30] Foreign Application Priority Data

Nov. 16, 1990 [JP] Japan .................................. 2-310678
Nov. 16, 1990 [JP] Japan .................................. 2-310679

[51] Int. Cl.$^6$ .................................................. G02B 15/14
[52] U.S. Cl. ........................... 359/676; 359/686; 359/687
[58] Field of Search .................................. 359/676–679, 359/683–688, 689, 690

[56] References Cited

U.S. PATENT DOCUMENTS

| | | | |
|---|---|---|---|
| 4,299,454 | 10/1981 | Betensky | 359/687 |
| 4,632,519 | 12/1986 | Takahashi | 359/687 |
| 4,653,872 | 3/1987 | Takahashi | 359/687 |
| 4,776,680 | 10/1988 | Tanaka | 359/684 |
| 4,789,226 | 12/1988 | Ogata | 359/687 |
| 4,890,904 | 1/1990 | Ito | 359/683 |
| 4,995,707 | 2/1991 | Hashimoto | 359/687 |
| 5,000,551 | 3/1991 | Shibayama | 359/687 |
| 5,042,927 | 8/1991 | Ogawa et al. | 359/683 |

FOREIGN PATENT DOCUMENTS

| | | |
|---|---|---|
| 57-161804 | 10/1982 | Japan . |
| 58-127908 | 7/1983 | Japan . |
| 62-270910 | 11/1987 | Japan . |

OTHER PUBLICATIONS

English Abstract of the Japanese reference No. 62–270,910.

Primary Examiner—Thong Nguyen
Attorney, Agent, or Firm—Fitzpatrick, Cella, Harper & Scinto

[57] ABSTRACT

A zoom lens of four-unit construction which comprises, in succession from the object side, a first lens unit of positive refractive power, a second lens unit of negative refractive power, a third lens unit of positive refractive power and a fourth lens unit of positive refractive power. During the zooming from the short focus side to the long focus side, the first lens unit and the fourth lens unit are moved toward the object side, the second lens unit is moved so that the air gap thereof with respect to the first lens unit may monotonously increase, and the third lens unit is moved so that the air gap thereof with respect to the second lens unit may monotonously decrease. The fourth lens unit is comprised, in succession from the object side, of a first positive lens having its convex surface of sharp curvature facing the image plane side, and a cemented lens comprising a meniscus positive lens having its concave surface facing the object side and a negative lens having its concave surface of sharp curvature facing the object side, the meniscus positive lens and the negative lens being cemented together.

10 Claims, 15 Drawing Sheets

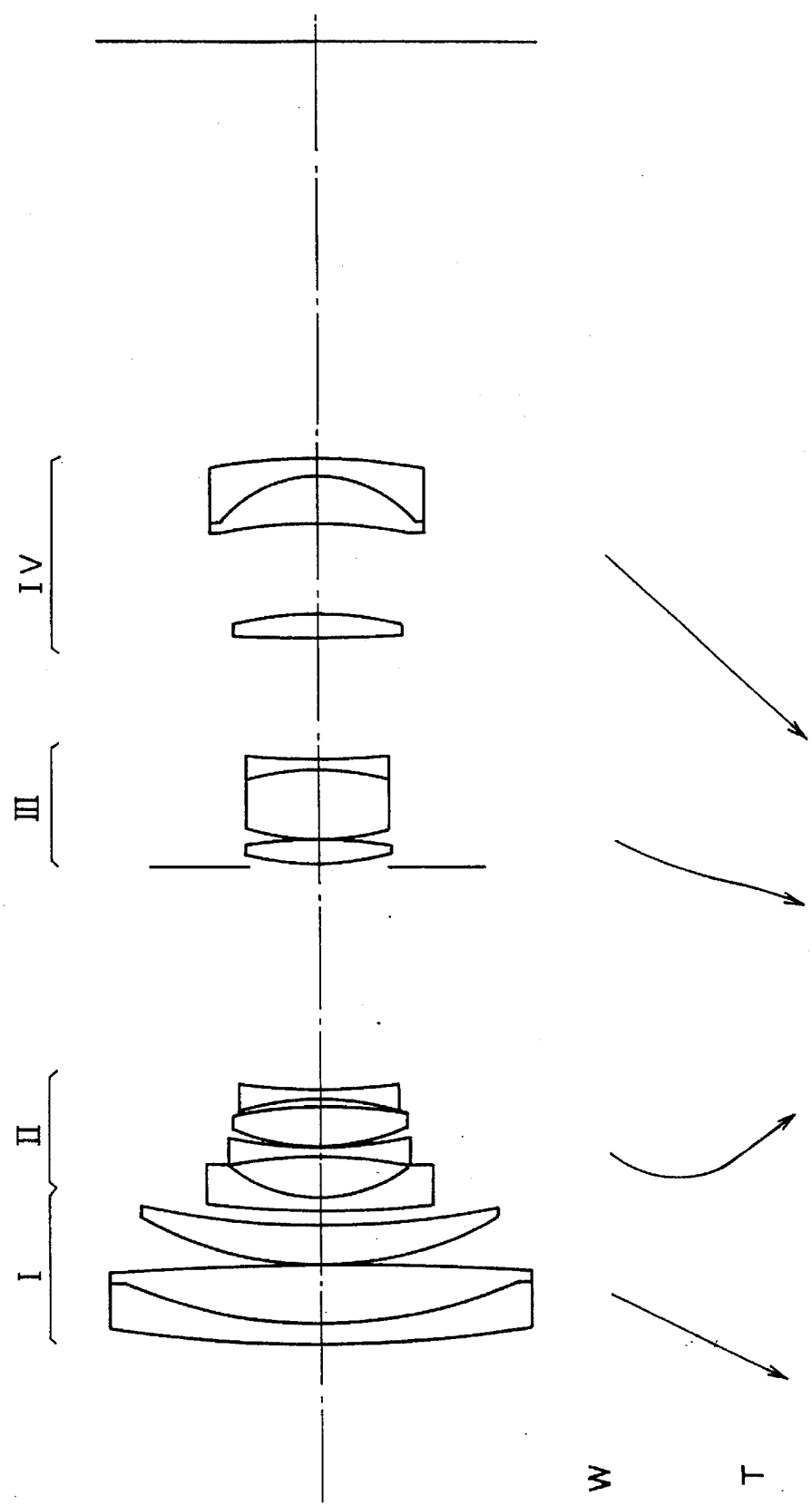

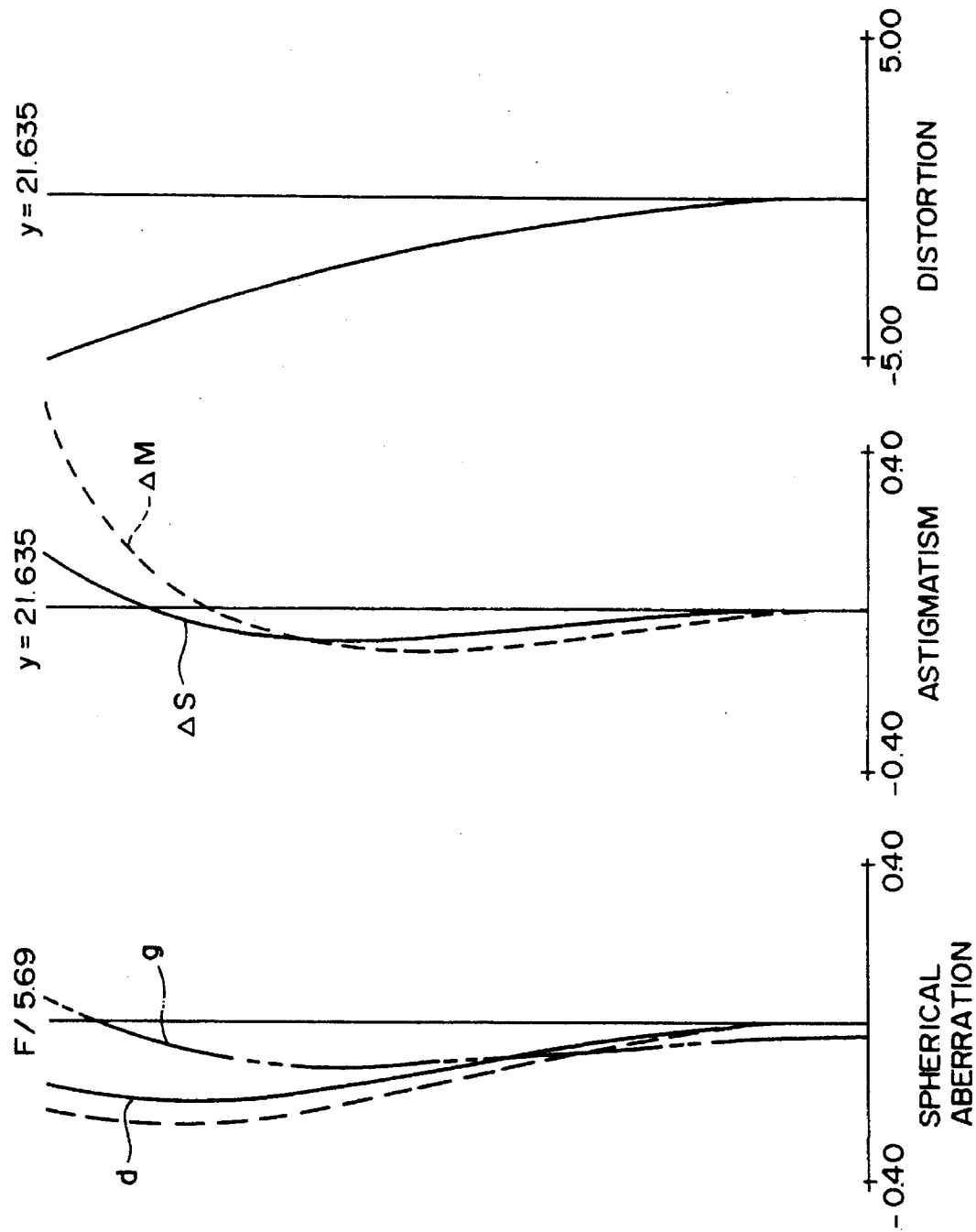

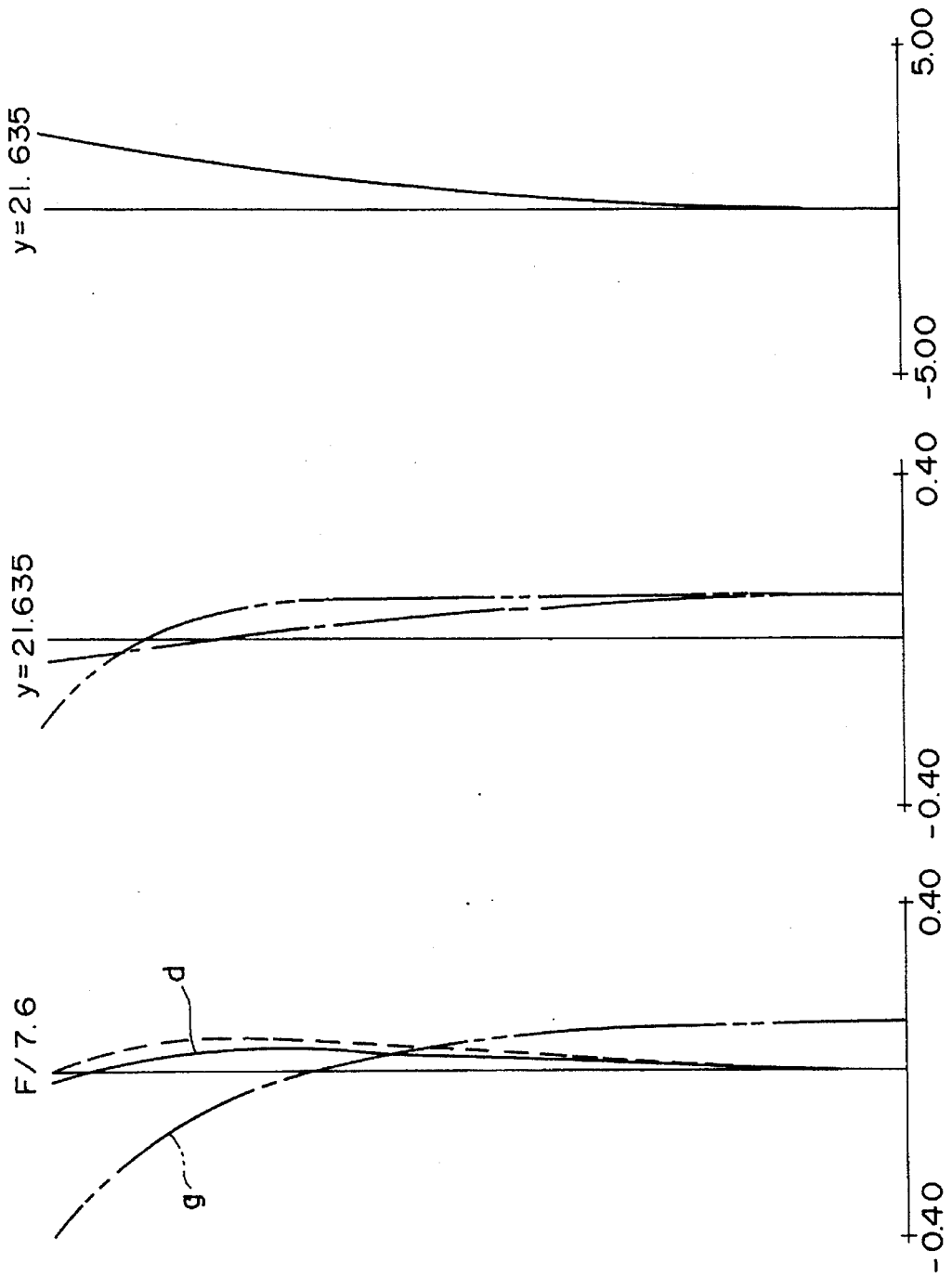

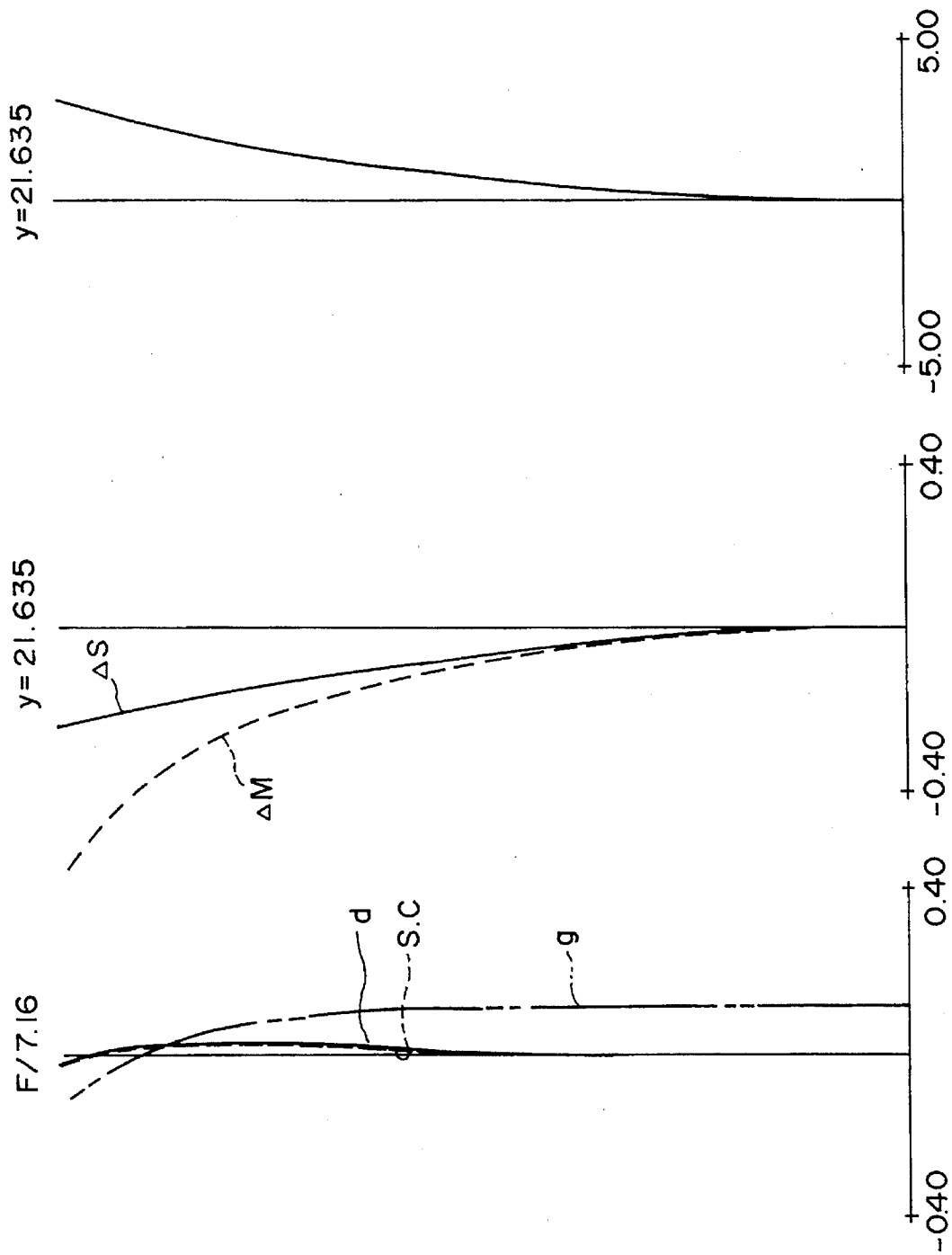

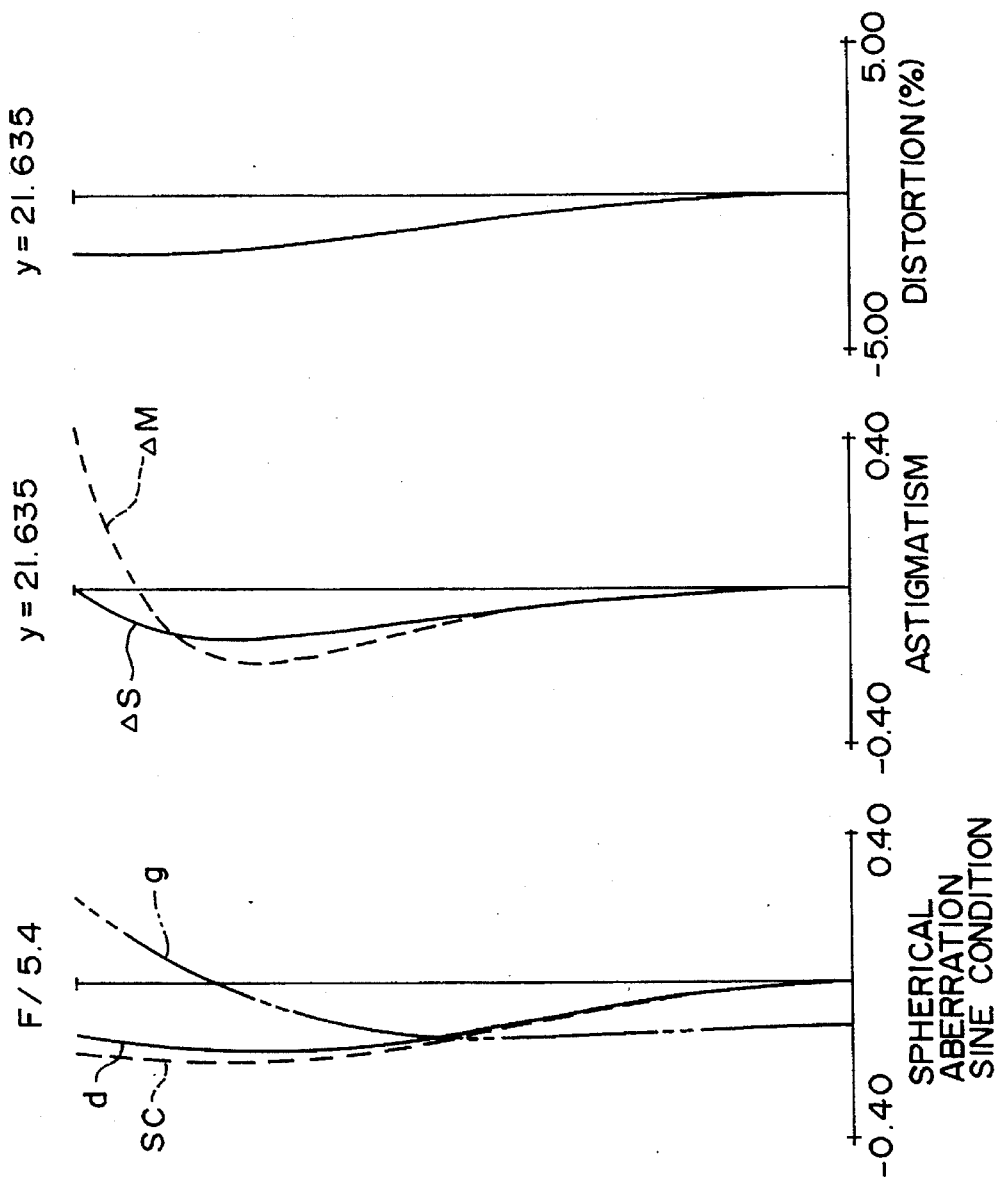

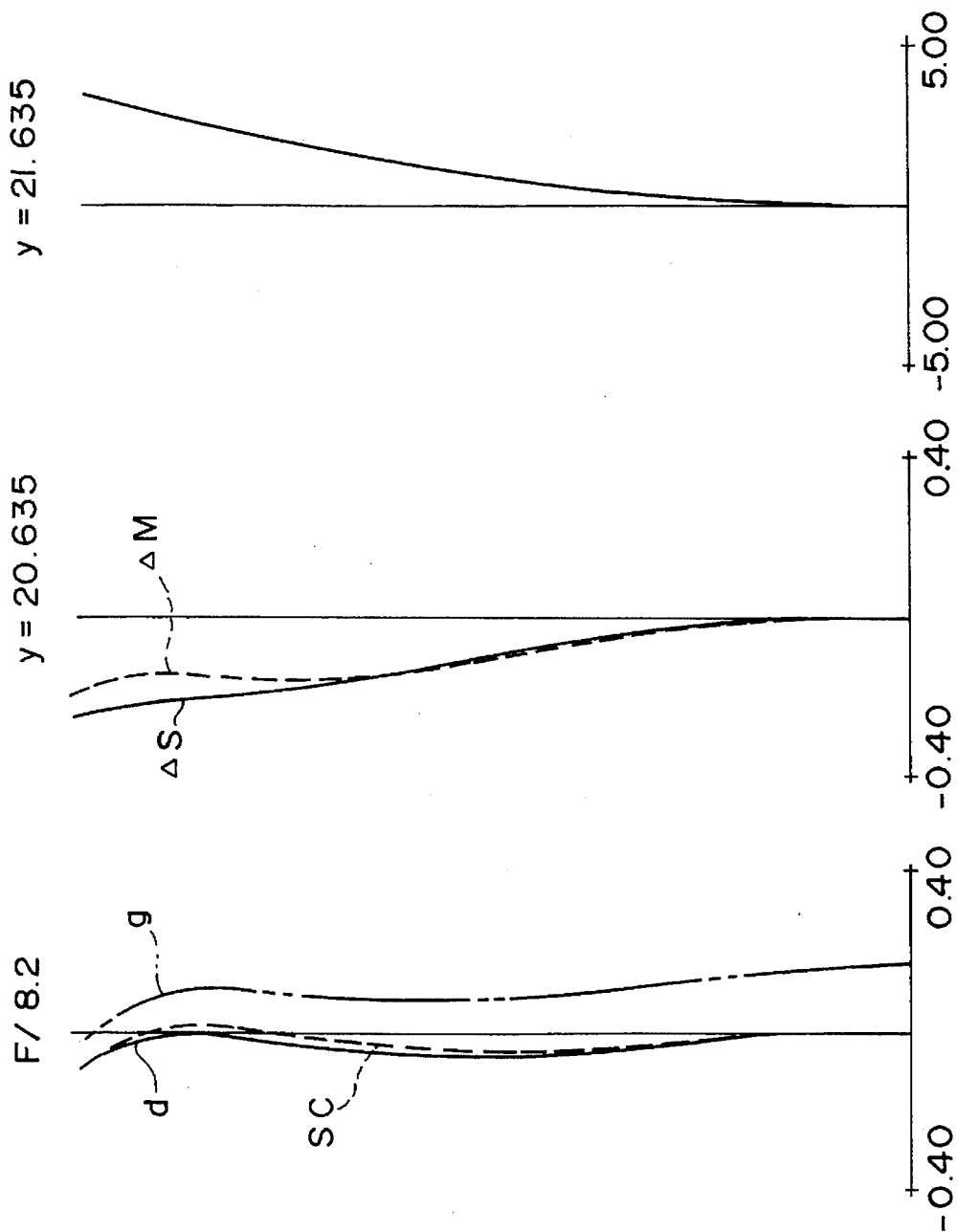

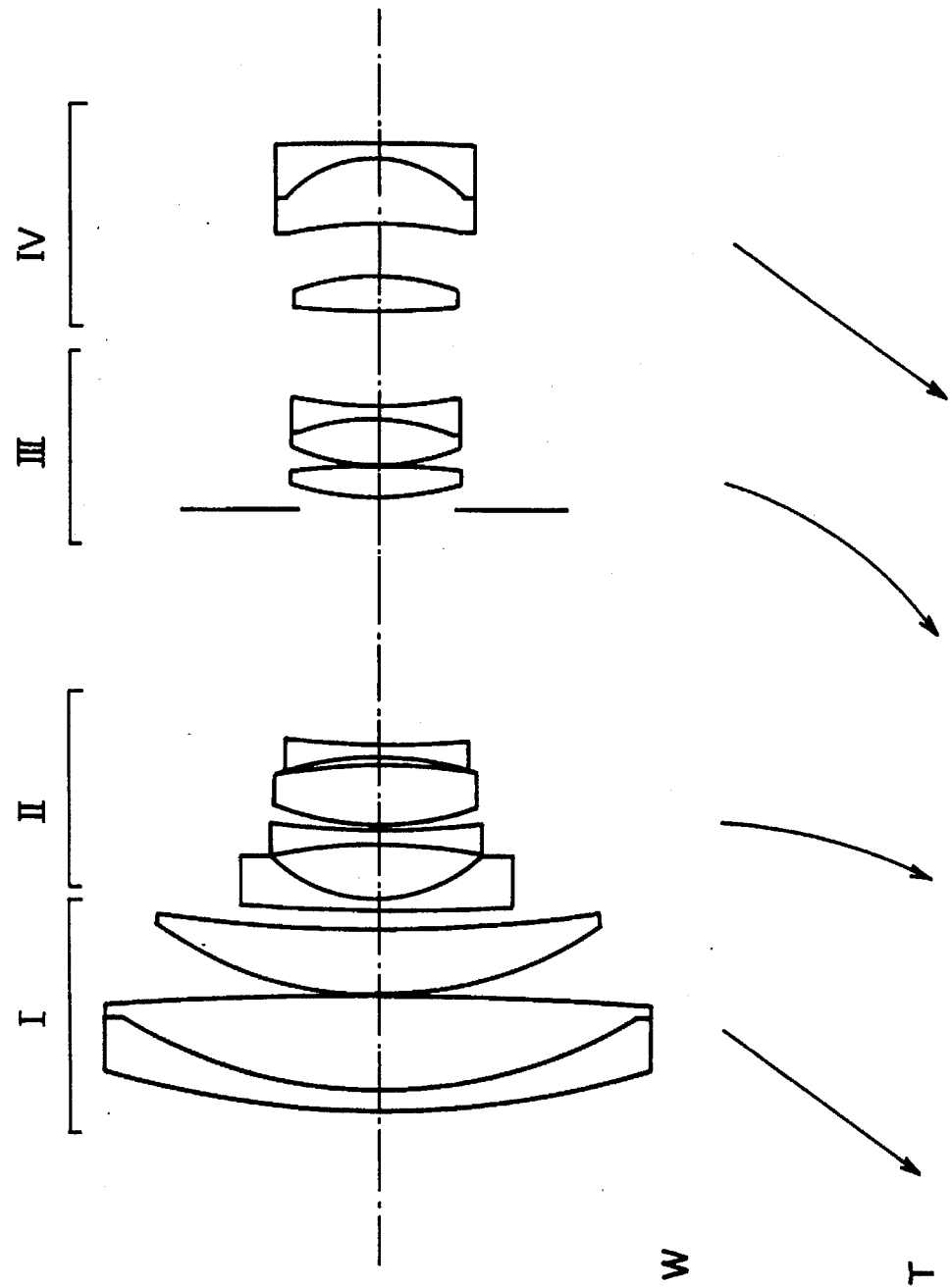

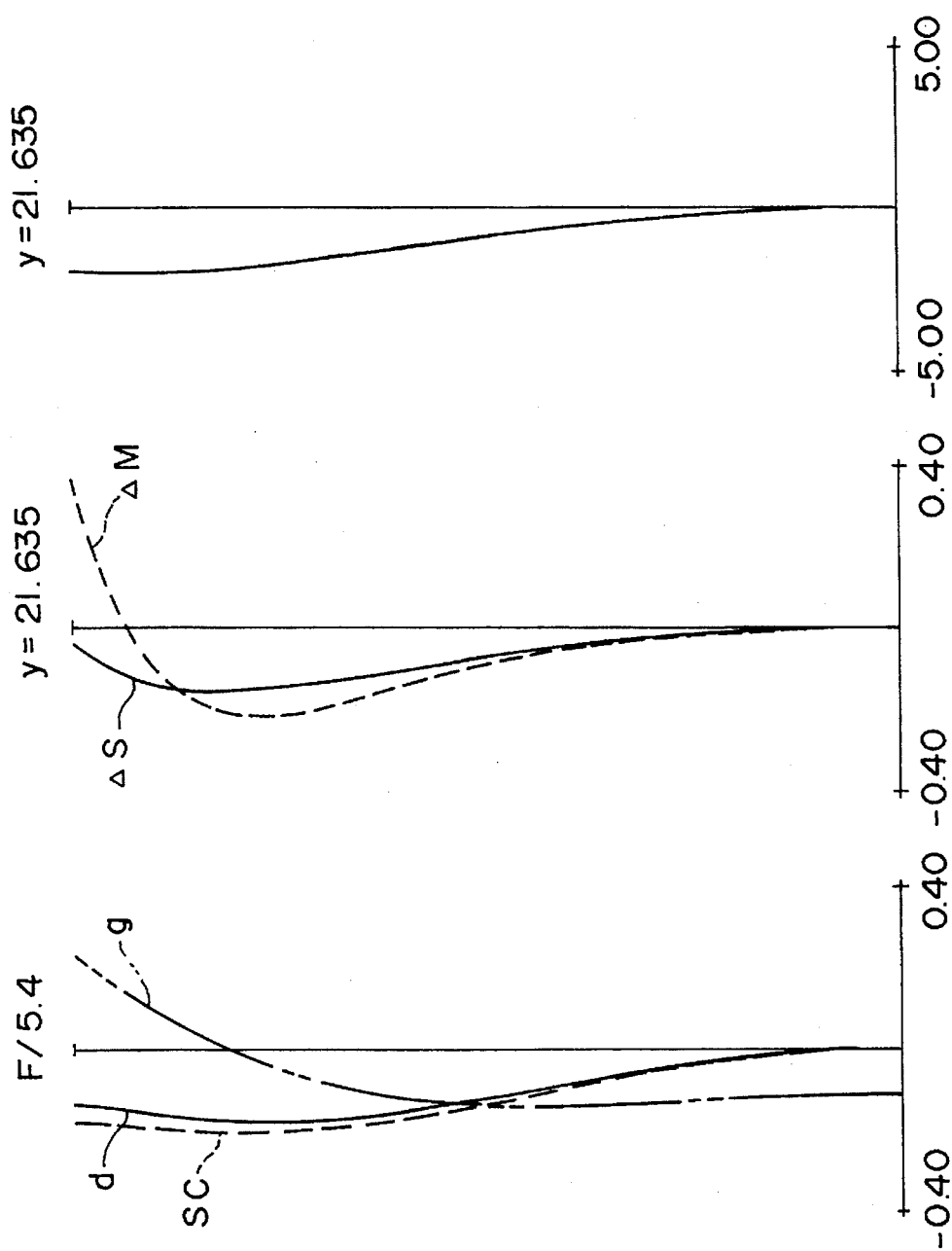

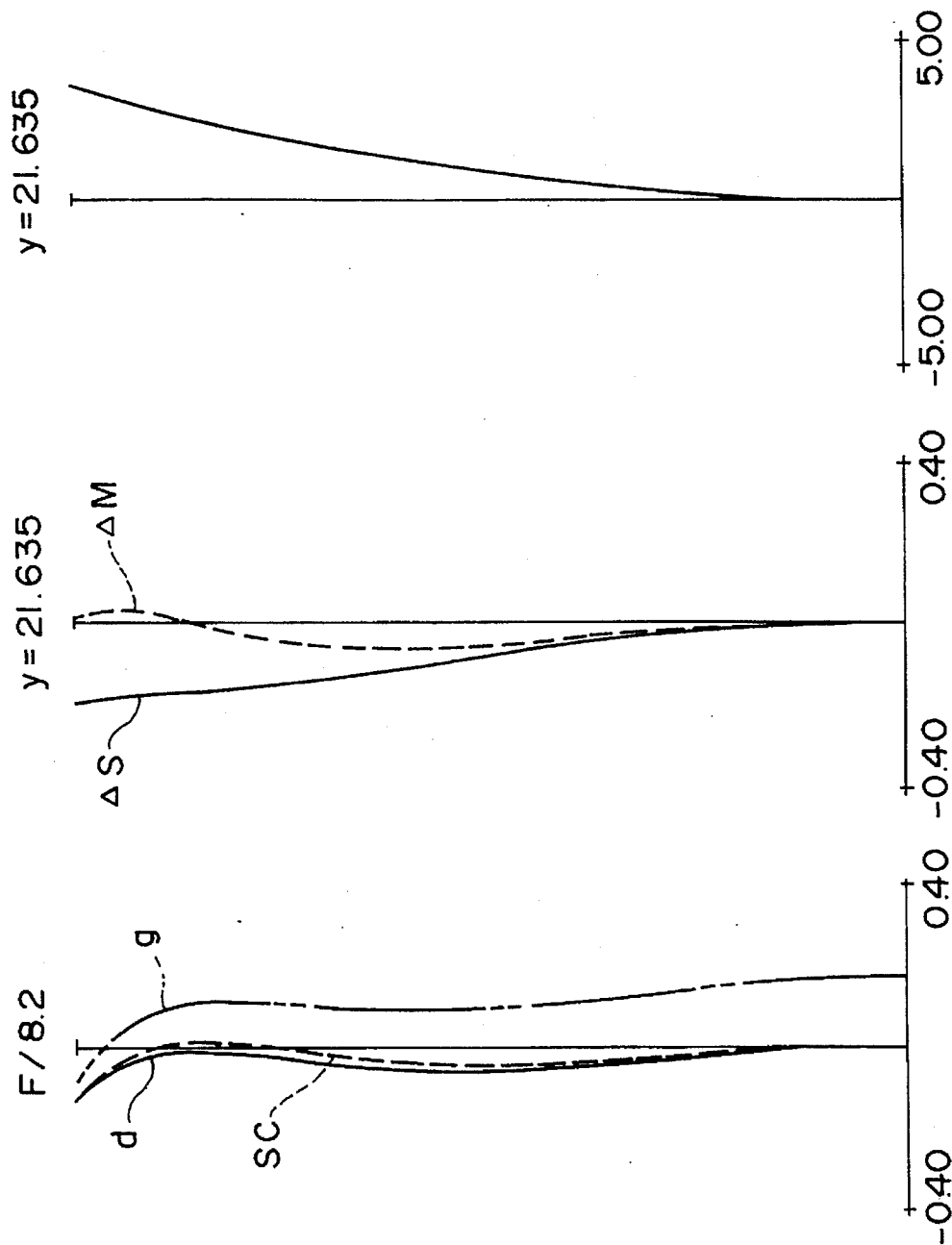

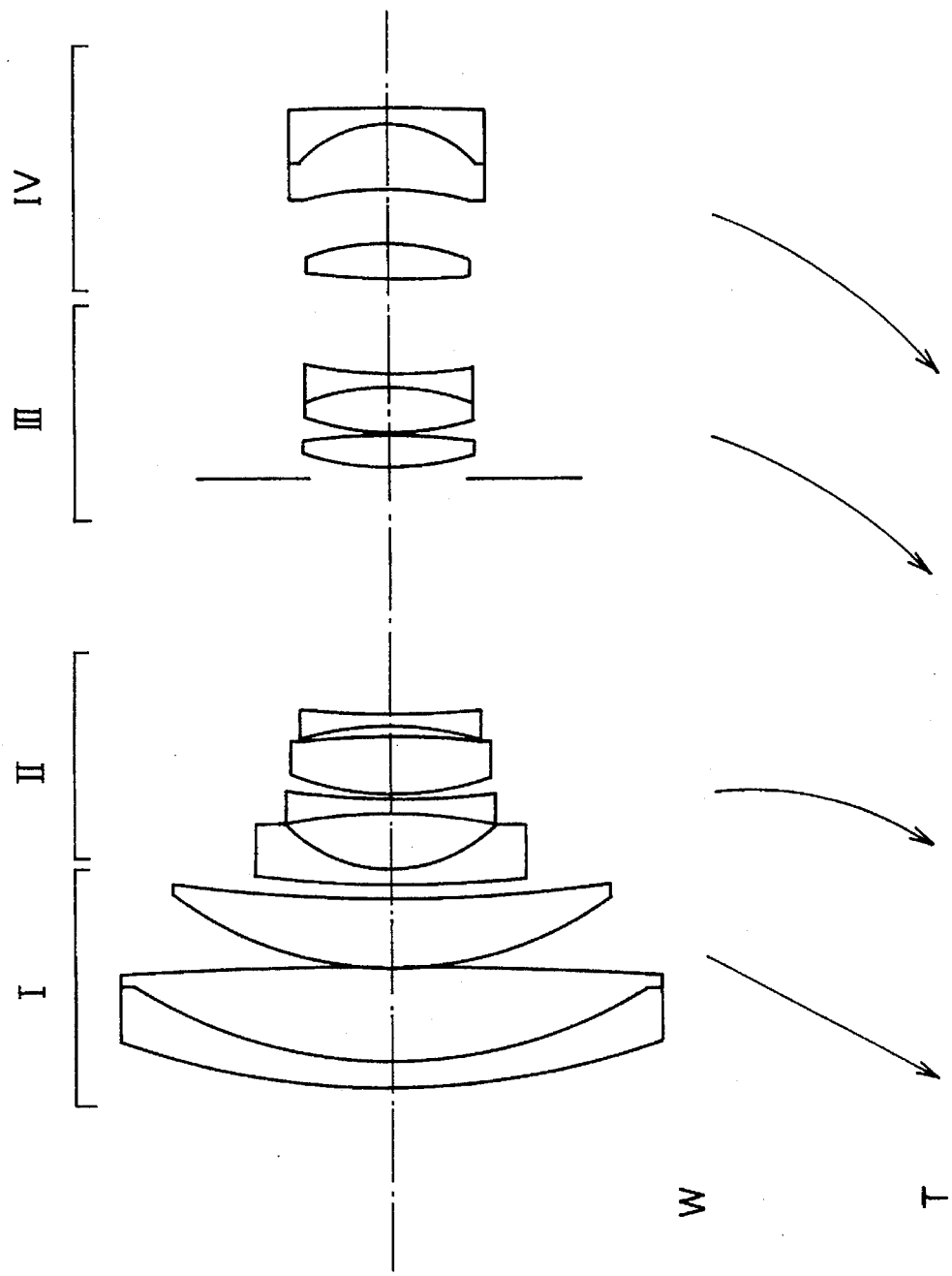

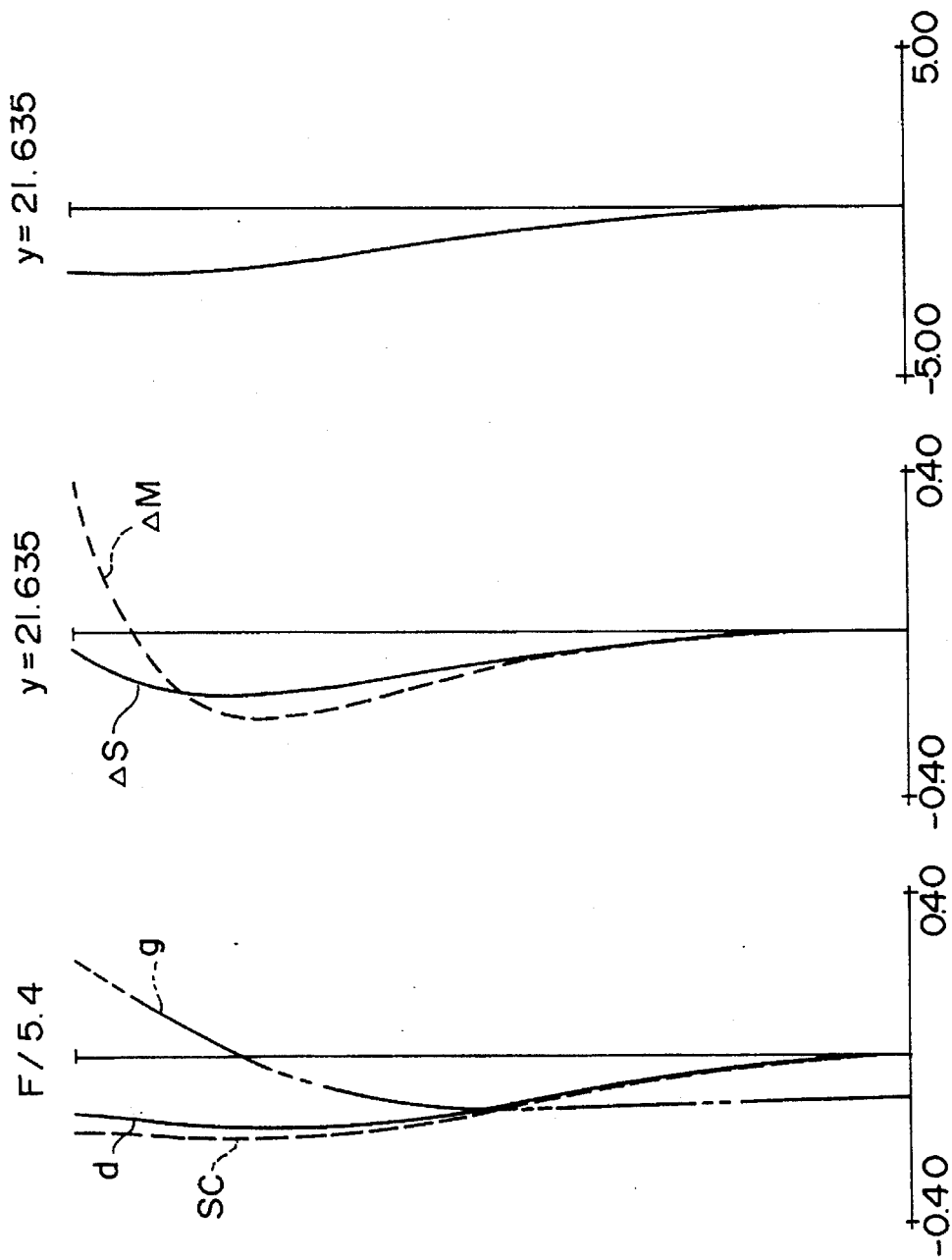

ZOOM LENS

This application is a continuation of application Ser. No. 07/792,157 filed Nov. 14, 1991, now abandoned.

BACKGROUND OF THE INVENTION

1. Field of the Invention

This invention relates to a four-unit type zoom lens, and particularly to a compact zoom lens having a zoom ratio of the order of six times and suitable for a single-lens reflex camera, a video camera or an electronic still camera.

2. Related Background Art

As a zoom lens in which the focal length at the wide angle end is shorter than the diagonal line of the picture plane and which has a zoom ratio as high as three or more times, there is well known a four-unit zoom lens comprising a first lens unit of positive refractive power, a second lens unit of negative refractive power, a third lens unit of positive refractive power and a fourth lens unit of positive refractive power.

Such zoom lenses are proposed in Japanese Patent Publication No. 61-55093, Japanese Laid-Open Patent Application No. 58-127908, U.S. Pat. No. 4,789,226, etc.

However, the zoom lenses disclosed in these publications are of relatively high variable power, but the full length of the lens, the diameter of the fore lens and the amount of movement of each lens unit for zooming are great, and these zoom lenses could not be said to minimize these and obtain a high performance.

SUMMARY OF THE INVENTION

It is the object of the present invention to provide a zoom lens which has a zoom ratio as high as the order of six times and yet which is compact and high in performance.

BRIEF DESCRIPTION OF THE DRAWINGS

FIG. 1 is a cross-sectional view of a lens according to numerical value example 1 of the present invention;

FIGS. 2A and 2B show various aberrations in numerical value example 1 of the present invention;

FIGS. 4A and 4B show various aberrations in numerical value example 2 of the present invention;

FIGS. 6A and 6B show various aberrations in numerical value example 3 of the present invention;

FIG. 7 is a cross-sectional view of a lens according to numerical value example 4 of the present invention;

FIGS. 8A and 8B show various aberrations in numerical value example 4 of the present invention;

FIG. 9 is a cross-sectional view of a lens according to numerical value example 5 of the present invention;

FIGS. 10A and 10B show various aberrations in numerical value example 5 of the present invention.

Figure 3:
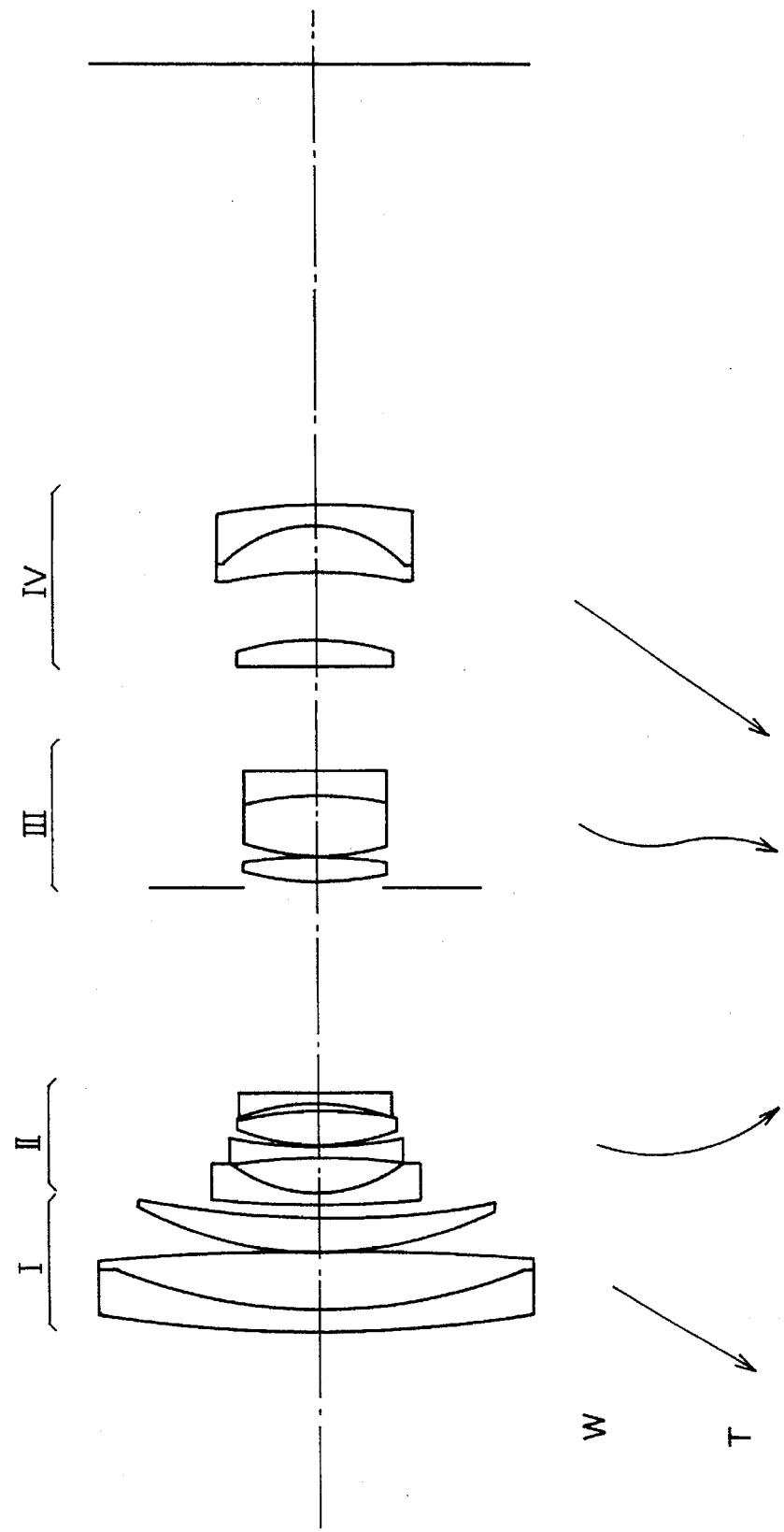
FIG. 3 is a cross-sectional view of a lens according to numerical value example 2 of the present invention.
Figure 4A:
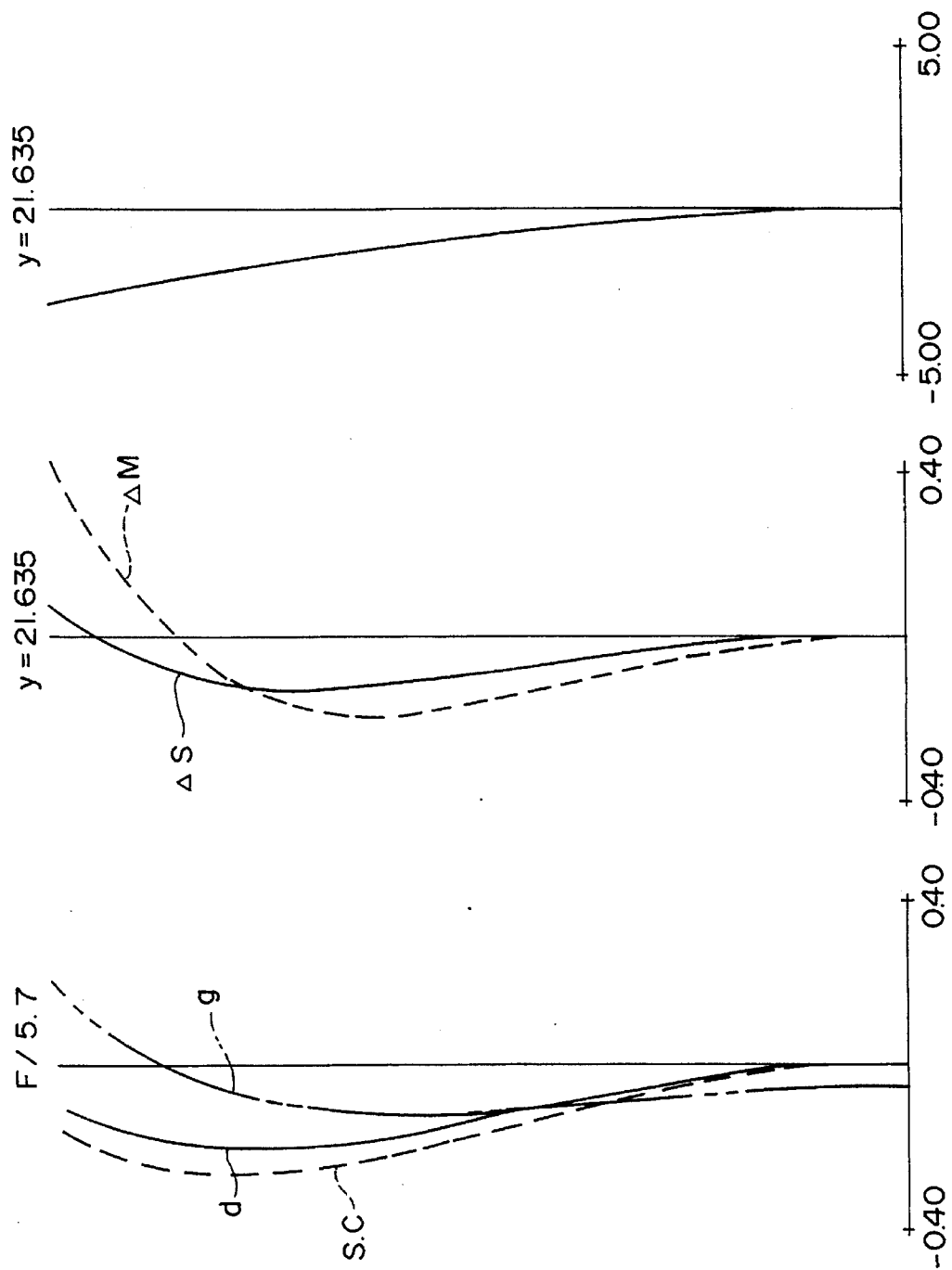
Figure 5:
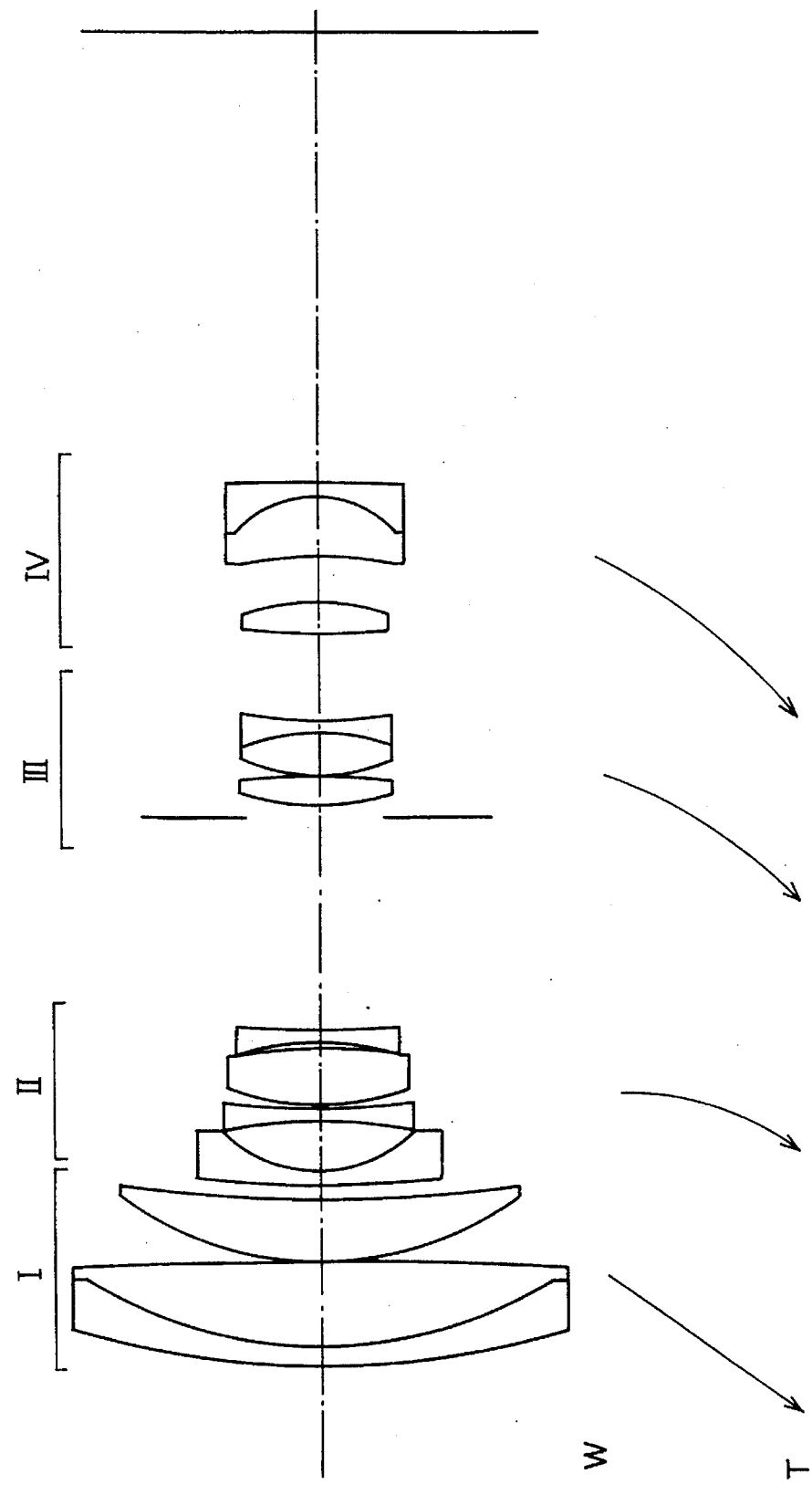
FIG. 5 is a cross-sectional view of a lens according to numerical value example 3 of the present invention.
Figure 10B:
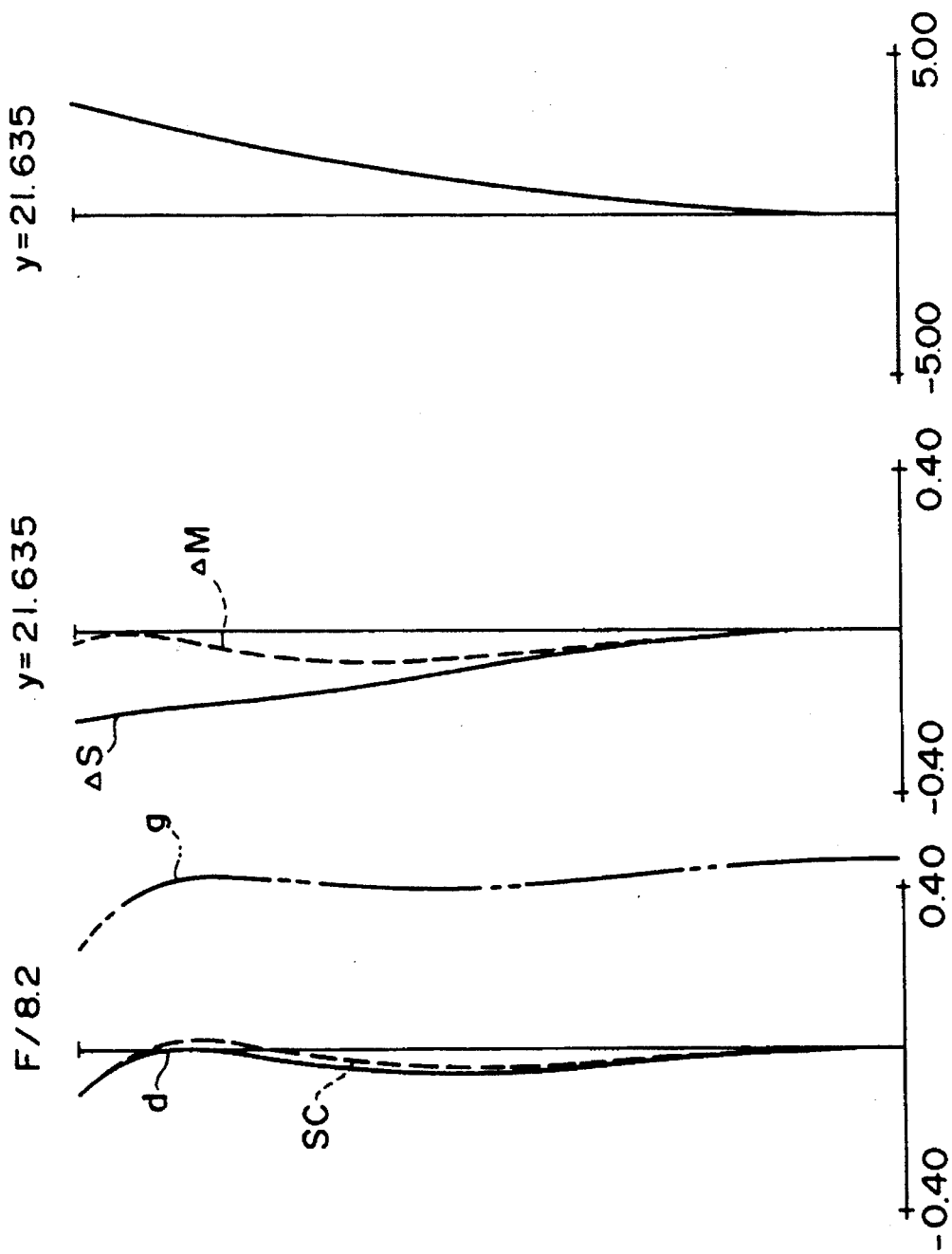

In the drawings, A and B show various aberrations at the wide angle end and the telephoto end, respectively.

$\Delta M$ and $\Delta S$ show the meridional image plane and the sagittal image plane, respectively, and SC, d and g show sine condition, d line and g line, respectively.

DETAILED DESCRIPTION OF THE PREFERRED EMBODIMENTS

Some embodiments of the present invention will hereinafter be described with reference to the drawings.

I designates a first lens unit having positive refractive power, II denotes a second lens unit having negative refractive power, III designates a third lens unit having positive refractive power, and IV denotes a fourth lens unit having positive refractive power. The fourth lens unit IV comprises, in succession from the object side, a first positive lens having its convex surface of sharp curvature facing the image plane side, and a cemented lens comprising a meniscus positive lens having its concave surface facing the object side and a negative lens having its surface of sharp curvature facing the object side, said meniscus positive lens and said negative lens being cemented together. Zooming from the wide angle end to the telephoto end is effected by each lens unit being moved along the optical axis as indicated by arrow.

To achieve the shortening of the full length of a zoom lens, a decrease in the amount of lens movement for zooming and a reduction in the diameter of the fore lens, there has heretofore been generally adopted a technique of strengthening the refractive power of each lens unit. However, if the refractive power is thus strengthened, it will become difficult to correct aberrations singly by each lens unit and particularly, great aberration fluctuation will occur in zooming. For example, in the first lens unit of relatively great zoom stroke as compared with the other lens units, the displacement of negative spherical aberration is great during zooming, and in the second lens unit of relatively strong refractive power as compared with the other lens units, the displacement not only of spherical aberration but also astigmatism in the positive direction becomes great during zooming. In the third lens unit which is second greatest in variable power share next to the second lens unit, particularly coma tends to be displaced in the negative direction (introversive coma) during zooming. Accordingly, in a zoom lens like the present invention, which is of high variable power and yet intends to achieve the shortening of the full length, it becomes important to minimize aberrations created in each lens unit and yet negate the aberrations mutually by the lens units. In a four-unit movement type zoom lens, taking as an example the mutual cancelling relation of spherical aberration between lens units, the fluctuation of the residual spherical aberration in the first to third lens units cannot be sufficiently cancelled mutually by the lens units but is displaced greatly in the negative direction, whereas in the present invention, the fourth lens unit is moved toward the object side and also the fourth lens unit is constructed as previously described, thereby eliminating the fluctuation of the residual spherical aberration.

The action of the present invention will now be described in greater detail. As previously described, the residual spherical aberration in the first to third lens units is negative, and is further displaced in the negative direction during the zooming from the short focus side to the long focus side. Coma also is negative (introversive coma) and likewise, with the zooming, it is further displaced in the negative direction. Astigmatism also is negative, but is displaced in the positive direction during the zooming. Accordingly, as the conditions of aberrations which should be created in the fourth lens unit, it is necessary that spherical aberration be positive and be displaced in the positive direction during the zooming from the short focus side to the long focus side and that coma be positive and be likewise displaced in the positive direction and astigmatism be positive and be displaced in the negative direction. However, the fourth lens unit originally has a positive refractive action and therefore, spherical aberration becomes negative, and this lens unit tends to promote the negative amount as the entire lens system.

So, in the present invention, the fourth lens unit is comprised, in succession from the object side, of a first positive lens having its convex surface of sharper curvature (the surface A) facing the image plane side, and a cemented lens (the cemented surface of which is the surface C) having negative refractive power as a whole and comprising a meniscus positive lens having its concave surface (the surface B) facing the object side and a negative lens having its concave surface of sharp curvature facing the object side, the meniscus positive lens and the negative lens being cemented together, so that negative spherical aberration created in the surface A may be cancelled by positive spherical aberration created in the surface C and further, the spherical aberration of the entire lens system may be corrected by spherical aberration created in the surface B.

As regards the elimination of the fluctuation of spherical aberration during zooming, if setting is made such that even when the fourth lens unit is moved toward the object side during the zooming from the short focus side to the long focus side, negative spherical aberration created in the surface A and positive spherical aberration created in the surface C for an increase in the incidence height of the on-axial light beam are always cancelled, positive spherical aberration created with an increase in the incidence height of the on-axial light beam entering the surface B can be displaced in the positive direction.

With regard to coma, positive coma is created in both of the surface C and the surface A to thereby correct the coma of the entire lens system, and as regards the elimination of the fluctuation of coma during zooming, the incidence height of the off-axial light beam entering the surface C and the surface A decreases with the movement of the fourth lens unit toward the object side. Therefore, in both of the surface C and the surface A, positive coma can be displaced in the positive direction.

With regard to astigmatism, relatively great positive astigmatism is created chiefly in the surface C and therefore, by controlling the radius of curvature of the surface C, the astigmatism of the entire lens system is corrected. As regards the elimination of the fluctuation of astigmatism during zooming, the incidence height of the off-axial light beam entering the surface C decreases with the movement of the fourth lens unit toward the object side and therefore, astigmatism can be displaced in the negative direction. Desirably, if an aspherical surface of such a shape that curvature becomes sharper away from the optical axis is provided on the surface B, it will be effective for promoting the displacement of spherical aberration in the positive direction in proportion to the increase in the incidence height of the on-axial light beam entering the surface B by zooming, and correcting coma, astigmatism and curvature of image field in a well-balanced manner.

Also, it is desirable that the ratio of the refractive power of the surface A to the refractive power of the surface C be as follows. That is, when the refractive power of the surface A is $\phi_A$ and the refractive power of the surface C is $\phi_C$, it is desirable to satisfy the following condition:

$$0.5 < |\phi_C|/\phi_A < 1.5 \quad (100_C < 0) \tag{1}$$

If the refractive power of the surface A becomes strong beyond the lower limit of expression (1), the amount of negative spherical aberration created in the surface A will increase and it will become impossible to cancel this aberration even by adding not only the surface C but also the surface B, and the spherical aberration of the entire lens system, including the fluctuation thereof, will be aggravated in the negative direction. Particularly, astigmatism on the short focus side will be aggravated in the negative direction.

If the absolute value of the negative refractive power of the surface C becomes great beyond the upper limit of expression (1), positive spherical aberration will be created in the entire fourth lens unit, and the correction of the short focus side will become somewhat advantageous, but over correction will take place on the long focus side and the spherical aberration will be displaced greatly in the positive direction. Also, astigmatism will likewise be over-corrected, and this is not good. Further, if the upper limit and the lower limit of expression (1) are exceeded, positive coma will be created and particularly, strong introversive coma will be created on the long focus side, and this is not good.

Further, it is desirable to satisfy the following condition:

$$0.1 < N_B - N_A < 0.35, \tag{2}$$

where $N_A$ is the refractive index of the positive lens, which constitutes the cemented lens in the fourth lens unit, and $N_B$ is the refractive index of the negative lens which constitutes the cemented lens in the fourth lens unit.

This conditional expression is chiefly for correcting coma better, and if the upper limit and the lower limit of this condition are exceeded, coma will be aggravated.

The object of the present invention is achieved by the above-described construction, but to make the entire lens system compact, it is preferable to set the focal length of the first lens unit as follows. When $f_T$ is the focal length of the entire system on the long focus side and $f_1$ is the focal length of the first lens unit, it is preferable to satisfy the following conditional expression:

$$0.25 < f_1/f_T < 0.363 \tag{3}$$

If the positive refractive power of the first lens unit becomes strong beyond the lower limit of conditional expression (3), it will be advantageous in respect of the full length of the lens, the diameter of the fore lens and zoom stroke, but particularly on the long focus side, spherical aberration will assume a great negative value which cannot be corrected by the other lens units. Also, when the first lens unit is a focusing lens unit, the displacement thereof in the negative direction will become remarkable particularly on the long focus side, and this is not good. If the positive refractive power of the first lens unit becomes weak beyond the upper limit of conditional expression (3), it will be advantageous in respect of the zooming fluctuation and focus fluctuation of spherical aberration, but the entire lens system will become bulky, and this is not good.

Further desirably, when the amounts of movement of the first lens unit and the second lens unit during the zooming from the wide angle end to the telephoto end are $A_1$ and $A_2$, respectively, $A_1$ and $A_2$ may be set as follows:

$$0.11 < A_2/(A_2 - A_1) < 0.26 \tag{4}$$

Conditional expression (4) is for making the full length of the lens compact on both of the short focus side and the long focus side and yet making the lens diameter of the first lens unit small. That is, if the amount of movement of the first lens unit becomes great and the amount of movement of the second lens unit becomes small beyond the lower limit of conditional expression (4), it will be advantageous for the shortening of the full length of the lens on the short focus side. Further, as the result, the distance between the first lens unit and a stop disposed in the rear lens unit (the third lens unit) will become shorter, and this will also be advantageous for making the lens diameter of the first lens unit small. However, the telephoto type will weaken on the long focus side and therefore, the full length of the lens on the long focus side will become greater, and this is not desirable. If the amount of movement of the first lens unit becomes small and the amount of movement of the second lens unit becomes great beyond the upper limit of conditional expression (4), a strong telephoto type will be provided on the long focus side and this will be advantageous for the shortening of the full length of the lens on the long focus side, but not only will the full length of the lens on the short focus side become great, but also the distance between the first lens unit and the stop disposed in the rear lens unit (the third lens unit) will become longer and therefore, the lens diameter of the first lens unit will become larger, and this is not good.

Furthermore, it is desirable to satisfy the following conditions:

$$1.5 < |f_1/m_1| < 3.5, \quad (5)$$

where $f_1$ is the focal length of the first lens unit, and $m_1$ is the zoom stroke from the wide angle end to the telephoto end;

$$-0.5 < B_{2w} < -0.1, \quad (6)$$

where $B_{2w}$ is the lateral magnification of the second lens unit at the wide angle end;

$$0.05 < \frac{e_{3T} - e_{3w}}{l} < 0.25, \quad (7)$$

where $e_{3w}$ and $e_{3T}$ are the principal point spacings of the third lens unit and the fourth lens unit at the wide angle end and the telephoto end, respectively, and $l$ is the diagonal length of the picture plane (in the case of 35 mm film size, $l=43$ mm); and $$Z_2 < \frac{Z}{2}, \quad (8)$$

where $Z_2$ is the variable power share ratio of the second lens unit from the wide angle end to the telephoto end, and $Z$ is the variable power ratio of the entire zoom lens system.

Conditional expression (5) is a conditional expression regarding the focal length and zoom stroke of the first lens unit. If the upper limit of this conditional expression is exceeded, it will become to earn the zoom ratio sufficiently and the full length of the zoom lens at the wide angle end will tend to become great and the portability of the camera will be spoiled, and this is not preferable. On the other hand, if the lower limit of this conditional expression is exceeded, the zoom stroke of the first lens unit will become long and particularly, the full length at the telephoto end will become great, and this is not preferable. Desirably, by adopting the range of $1.5<|f_1/m_1|<2$, the full length of the lens on the wide angle side can be shortened.

Conditional expression (6) is a condition for prescribing the range of the lateral magnification of the second lens unit at the wide angle end, and if the upper limit of this condition is exceeded in connection with conditional expression (5), the full length of the lens on the wide angle side will tend to become great, and this is not preferable. On the other hand, if the lower limit of this condition is exceeded, the full length of the lens on the wide angle side can be shortened, but the correction of spherical aberration and coma, particularly, introversive coma, will become difficult.

Conditional expression (7) is a conditional expression regarding the principal point spacing between the third lens unit and the fourth lens unit. If the upper limit of this conditional expression is exceeded, the total amount of movement of the third lens unit and the fourth lens unit resulting from zooming will become great and the fluctuation of curvature of image field will become great. On the other hand, if the lower limit of this conditional expression is exceeded, the correction of curvature of image field will become difficult.

Conditional expression (8) is a conditional expression showing the variable power share of the second lens unit. If this condition is departed from, the fluctuation of aberration created by the second lens unit in the intermediate zoom area will become great.

A first embodiment of the present invention is of a construction as will hereinafter be described. In succession from the object side, the first lens unit is comprised of a cemented lens comprising a meniscus negative lens having its concave surface facing the image plane side and a biconvex lens cemented together and having positive refractive power as a whole, and a meniscus positive lens having its convex surface of sharp curvature facing the object side, the second lens unit is comprised of a meniscus negative lens having its concave surface of sharp curvature facing the image plane side, a biconcave lens, a biconvex lens and a biconcave lens having its surface of sharper curvature facing the object side, the third lens unit is comprised of a biconvex lens and a cemented lens comprising a biconvex lens and a biconcave lens having its surface of sharper curvature facing the object side, the biconvex lens and the biconcave lens being cemented together, the cemented lens having positive refractive power as a whole. The fourth lens unit is comprised of a biconvex lens having its surface of sharper curvature facing the image plane side, and a cemented lens comprising a meniscus positive lens having its convex surface of sharp curvature facing the image plane side and a meniscus negative lens having its concave surface of sharp curvature facing the object side, the meniscus positive lens and the meniscus negative lens being cemented together, the cemented lens having negative refractive power as a whole. Particularly in the first and second numerical value examples, during the zooming from the short focus to the long focus side, the first lens unit and the fourth lens unit are moved together toward the object side and the second lens unit is once curvedly moved toward the object side, and then is moved toward the image plane side, and the air gap of the first lens unit is always monotonously increased. It is for improving the performance at the intermediate focal length that the second lens unit is thus curvedly moved, and the second lens unit is moved along a curve inflated toward the object side to keep particularly spherical aberration good.

The third lens unit also is curvedly moved, but this movement is for correcting curvature of image field. That is, in the first embodiment, the third lens unit is curvedly moved toward the object side, and in a second embodiment, it is once curvedly moved toward the object side, and then is moved toward the image plane side, and is further moved toward the object side, thereby correcting curvature of image field.

On the other hand, in third, fourth and fifth embodiments, the second lens unit is monotonously moved toward the object side to thereby effect zooming.

In the present embodiment, the first lens unit is moved toward the object side to thereby effect focusing, but the third lens unit may be moved toward the image plane side, or the fourth lens unit may be moved toward the object side.

Some numerical value examples of the present invention will be shown below. In the numerical value examples below, Ri is the radius of curvature of the ith lens surface from the object side, Di is the thickness and air gap of the ith lens from the object side, and Ni and νi are the refractive index and Abbe number, respectively, of the glass of the ith lens from the object side. The aspherical shape in the present embodiment is given by the following equation:

$$X = r\{1-(1-h^2/r^2)^{0.5}\} + Ah^2 + Bh^4 + Ch^6 + Dh^8,$$

where X is the amount of displacement in the direction of the optical axis at the height h from the optical axis, r is the radius of curvature of a spherical surface which is the reference, and A, B, C and D are aspherical coefficients. Also, in the aspherical coefficients, D±a shows $10^{\pm a}$.

NUMERICAL VALUE EXAMPLE 1 f = 36.2~193.2    Fno = 5.7~7.59

| | | | | | | | |
|---|---|---|---|---|---|---|---|
| R1 = | 125.253 | D1 = | 2.20 | N1 = | 1.84666 | ν1 = | 23.9 |
| R2 = | 50.226 | D2 = | 5.49 | N2 = | 1.65160 | ν2 = | 58.5 |
| R3 = | −378.941 | D3 = | 0.10 | | | | |
| R4 = | 313.984 | D4 = | 3.81 | N3 = | 1.69680 | ν3 = | 55.5 |
| R5 = | 83.402 | D5 = | variable | | | | |
| R6 = | 122.826 | D6 = | 1.20 | N4 = | 1.80400 | ν4 = | 46.0 |
| R7 = | 14.129 | D7 = | 3.81 | | | | |
| R8 = | −65.737 | D8 = | 1.15 | N5 = | 1.83481 | ν5 = | 42.7 |
| R9 = | 42.635 | D9 = | 0.15 | | | | |
| R10 = | 22.956 | D10 = | 3.57 | N6 = | 1.84666 | ν6 = | 23.9 |
| R11 = | −50.426 | D11 = | 0.77 | | | | |
| R12 = | −27.459 | D12 = | 1.15 | N7 = | 1.77250 | ν7 = | 49.6 |
| R13 = | 124.080 | D13 = | variable | | | | |
| R14 = | ∞ (aperture) | D14 = | 0.50 | | | | |
| R15 = | 34.348 | D15 = | 2.28 | N8 = | 1.61800 | ν8 = | 63.4 |
| R16 = | −57.626 | D16 = | 0.15 | | | | |
| R17 = | 29.416 | D17 = | 6.66 | N9 = | 1.48749 | ν9 = | 70.2 |
| R18 = | −24.068 | D18 = | 1.10 | N10 = | 1.85805 | ν10 = | 31.9 |
| R19 = | 151.897 | D19 = | variable | | | | |
| R20 = | 207.640 | D20 = | 2.35 | N11 = | 1.69680 | ν11 = | 55.5 |
| *R21 = | −38.482 | D21 = | 8.84 | | | | |
| R22 = | −51.087 | D22 = | 4.50 | N12 = | 1.53256 | ν12 = | 45.9 |
| R23 = | −12.175 | D23 = | 1.80 | N13 = | 1.77250 | ν13 = | 49.6 |
| R24 = | −55.241 | | | | | | |

| Variable distance | Focal length | |
|---|---|---|
| | 36.20 | 193.20 |
| D5 | 1.50 | 30.29 |
| D13 | 21.34 | 1.10 |
| D19 | 11.44 | 2.89 | aspherical coefficients

| r | A | B | C | D |
|---|---|---|---|---|
| −5.10866D + 01 | 0.00000D + 00 | −6.89458D − 06 | −2.12039D − 08 | 3.84100D − 10 |

NUMERICAL VALUE EXAMPLE 2 f = 36.3~194    Fno = 5.7~7.16

| | | | | | | | |
|---|---|---|---|---|---|---|---|
| R1 = | 112.255 | D1 = | 2.20 | N1 = | 1.84666 | ν1 = | 23.9 |
| R2 = | 51.664 | D2 = | 5.63 | N2 = | 1.6516 | ν2 = | 58.5 |
| R3 = | −313.772 | D3 = | 0.10 | | | | |
| R4 = | 40.355 | D4 = | 3.01 | N3 = | 1.69680 | ν3 = | 55.5 |
| R5 = | 76.758 | D5 = | variable | | | | |
| R6 = | 98.687 | D6 = | 1.20 | N4 = | 1.80400 | ν4 = | 46.6 |
| R7 = | 14.053 | D7 = | 3.40 | | | | |
| R8 = | −72.027 | D8 = | 1.15 | N5 = | 1.83481 | ν5 = | 42.7 |
| R9 = | 38.071 | D9 = | 0.15 | | | | |
| R10 = | 21.833 | D10 = | 3.19 | N6 = | 1.84666 | ν6 = | 23.9 |
| R11 = | −67.034 | D11 = | 0.73 | | | | |
| R12 = | −27.761 | D12 = | 1.15 | N7 = | 1.77250 | ν7 = | 49.6 |
| R13 = | 222.103 | D13 = | variable | | | | |
| R14 = | ∞ (aperture) | D14 = | 0.50 | | | | |
| R15 = | 35.788 | D15 = | 2.23 | N8 = | 1.61800 | ν8 = | 63.4 |
| R16 = | −68.632 | D16 = | 0.15 | | | | |
| R17 = | 24.908 | D17 = | 6.10 | N9 = | 1.48749 | ν9 = | 70.2 |
| R18 = | −23.291 | D18 = | 2.02 | N10 = | 1.85805 | ν10 = | 31.9 |
| R19 = | 425.365 | D19 = | Variable | | | | |
| R20 = | −262.155 | D20 = | 2.63 | N11 = | 1.69680 | ν11 = | 55.5 |

|  |  |  |  |  |  |  |  |
|---|---|---|---|---|---|---|---|
| R21 = | −29.007 | D21 = | 6.58 | | | | |
| *R22 = | −54.91 | D22 = | 4.50 | N12 = | 1.53256 | ν12 = | 45.9 |
| R23 = | −11.79 | D23 = | 1.80 | N13 = | 1.74320 | ν13 = | 49.3 |
| R24 = | −80.96 | | | | | | |

| Variable | Focal length | |
|---|---|---|
| distance | 36.30 | 194.01 |
| D5 | 1.50 | 36.52 |
| D13 | 19.92 | 1.12 |
| D19 | 9.94 | 1.28 |

| aspherical coefficients | | | | |
|---|---|---|---|---|
| r | A | B | C | D |
| −5.49109D + 01 | 0.00000D + 00 | −1.72934D − 05 | −7.18919D − 08 | 1.54620D − 10 |

NUMERICAL VALUE EXAMPLE 3 f = 36.29~193.10    Fno = 1:5.4–8.2

| | | | | | | | |
|---|---|---|---|---|---|---|---|
| r1 = | 76.400 | d1 = | 2.10 | n1 = | 1.80518 | ν1 = | 25.4 |
| r2 = | 41.565 | d2 = | 7.75 | n2 = | 1.60311 | ν2 = | 60.7 |
| r3 = | −536.916 | d3 = | 0.12 | | | | |
| r4 = | 33.542 | d4 = | 5.50 | n3 = | 1.49700 | ν3 = | 81.6 |
| r5 = | 130.937 | d5 = | variable | | | | |
| r6 = | 149.808 | d6 = | 1.20 | n4 = | 1.80400 | ν4 = | 46.6 |
| r7 = | 13.669 | d7 = | 4.54 | | | | |
| r8 = | −45.170 | d8 = | 1.15 | n5 = | 1.83481 | ν5 = | 42.7 |
| r9 = | 67.369 | d9 = | 0.37 | | | | |
| r10 = | 24.538 | d10 = | 5.05 | n6 = | 1.84666 | ν6 = | 23.9 |
| r11 = | −48.367 | d11 = | 0.53 | | | | |
| r12 = | −27.544 | d12 = | 1.15 | n7 = | 1.77250 | ν7 = | 49.6 |
| r13 = | 100.068 | d13 = | variable | | | | |
| r14 = | ∞ (aperture) | d14 = | 1.00 | | | | |
| r15 = | 24.897 | d15 = | 2.60 | n8 = | 1.65160 | ν8 = | 58.5 |
| r16 = | −69.784 | d16 = | 0.12 | | | | |
| r17 = | 20.495 | d17 = | 3.86 | n9 = | 1.48749 | ν9 = | 70.2 |
| r18 = | −20.495 | d18 = | 1.10 | n10 = | 1.83400 | ν10 = | 37.2 |
| r19 = | 38.164 | d19 = | variable | | | | |
| r20 = | 56.088 | d20 = | 3.00 | n11 = | 1.58313 | ν11 = | 59.4 |
| *r21 = | −20.092 | d21 = | 4.32 | | | | |
| r22 = | −32.691 | d22 = | 5.50 | n12 = | 1.53256 | ν12 = | 45.9 |
| r23 = | −9.939 | d23 = | 1.30 | n13 = | 1.77250 | ν13 = | 49.6 |
| r24 = | −151.853 | | | | | | |

| Variable | Focal length | |
|---|---|---|
| distance | 36.29 | 193.10 |
| d5 | 1.50 | 23.00 |
| d13 | 19.51 | 1.11 |
| d19 | 7.78 | 4.72 |

| aspherical coefficients | | | | |
|---|---|---|---|---|
| r | A | B | C | D |
| −2.00925D + 01 | 0.00000D + 00 | 1.87375D − 05 | −2.51628D − 08 | −3.22516D − 10 |

NUMERICAL VALUE EXAMPLE 4 f = 36.29~193.57    Fno = 1:5.4–8.2

| | | | | | | | |
|---|---|---|---|---|---|---|---|
| r1 = | 73.795 | d1 = | 2.10 | n1 = | 1.84666 | ν1 = | 23.8 |
| r2 = | 42.146 | d2 = | 7.75 | n2 = | 1.60311 | ν2 = | 60.7 |
| r3 = | −499.005 | d3 = | 0.12 | | | | |
| r4 = | 33.173 | d4 = | 5.60 | n3 = | 1.48749 | ν3 = | 70.2 |
| r5 = | 129.144 | d5 = | variable | | | | |
| r6 = | 149.808 | d6 = | 1.20 | n4 = | 1.80400 | ν4 = | 46.6 |
| r7 = | 13.669 | d7 = | 4.54 | | | | |

-continued

| | | | | | | | |
|---|---|---|---|---|---|---|---|
| r8 = | −45.170 | d8 = | 1.15 | n5 = | 1.83481 | v5 = | 42.7 |
| r9 = | 67.369 | d9 = | 0.37 | | | | |
| r10 = | 24.538 | d10 = | 5.05 | n6 = | 1.84666 | v6 = | 23.9 |
| r11 = | −48.367 | d11 = | 0.53 | | | | |
| r12 = | −27.544 | d12 = | 1.15 | n7 = | 1.77250 | v7 = | 49.6 |
| r13 = | 100.068 | d13 = | variable | | | | |
| r14 = | ∞ (aperture) | d14 = | 1.00 | | | | |
| r15 = | 24.897 | d15 = | 2.60 | n8 = | 1.65160 | v8 = | 58.5 |
| r16 = | −69.784 | d16 = | 0.12 | | | | |
| r17 = | 20.495 | d17 = | 3.86 | n9 = | 1.48749 | v9 = | 70.2 |
| r18 = | −20.495 | d18 = | 1.10 | n10 = | 1.83400 | v10 = | 37.2 |
| r19 = | 38.164 | d19 = | variable | | | | |
| r20 = | 56.088 | d20 = | 3.00 | n11 = | 1.58313 | v11 = | 59.4 |
| *r21 = | −20.092 | d21 = | 4.32 | | | | |
| r22 = | −32.691 | d22 = | 5.50 | n12 = | 1.53256 | v12 = | 45.9 |
| r23 = | −9.939 | d23 = | 1.30 | n13 = | 1.77250 | v13 = | 49.6 |
| r24 = | −151.853 | | | | | | |

| Variable | Focal length | |
|---|---|---|
| distance | 36.29 | 193.57 |
| d5 | 1.35 | 22.84 |
| d13 | 19.51 | 1.06 |
| d19 | 7.78 | 4.78 |

| | aspherical coefficients | | | |
|---|---|---|---|---|
| r | A | B | C | D |
| −2.00925D + 01 | 0.00000D + 00 | 1.87375D − 05 | −2.51628D − 08 | −3.22516D − 10 |

NUMERICAL VALUE EXAMPLE 5

| | f = 36.29~193.26 | | Fno = 1:5.4~8.2 | | | | |
|---|---|---|---|---|---|---|---|
| r1 = | 73.795 | d1 = | 2.10 | n1 = | 1.84666 | v1 = | 23.8 |
| r2 = | 41.694 | d2 = | 7.75 | n2 = | 1.60311 | v2 = | 60.7 |
| r3 = | −514.247 | d3 = | 0.12 | | | | |
| r4 = | 33.173 | d4 = | 5.60 | n3 = | 1.48749 | v3 = | 70.2 |
| r5 = | 132.582 | d5 = | variable | | | | |
| r6 = | 149.808 | d6 = | 1.20 | n4 = | 1.80400 | v4 = | 46.6 |
| r7 = | 13.669 | d7 = | 4.54 | | | | |
| r8 = | −45.170 | d8 = | 1.15 | n5 = | 1.83481 | v5 = | 42.7 |
| r9 = | 67.369 | d9 = | 0.37 | | | | |
| r10 = | 24.538 | d10 = | 5.05 | n6 = | 1.84666 | v6 = | 23.9 |
| r11 = | −48.367 | d11 = | 0.53 | | | | |
| r12 = | −27.544 | d12 = | 1.15 | n7 = | 1.77250 | v7 = | 49.6 |
| r13 = | 100.068 | d13 = | variable | | | | |
| r14 = | ∞ (aperture) | d14 = | 1.00 | | | | |
| r15 = | 24.897 | d15 = | 2.60 | n8 = | 1.65160 | v8 = | 58.5 |
| r16 = | −69.784 | d16 = | 0.12 | | | | |
| r17 = | 20.495 | d17 = | 3.86 | n9 = | 1.48749 | v9 = | 70.2 |
| r18 = | −20.495 | d18 = | 1.10 | n10 = | 1.83400 | v10 = | 37.2 |
| r19 = | 38.164 | d19 = | variable | | | | |
| r20 = | 56.088 | d20 = | 3.00 | n11 = | 1.58313 | v11 = | 59.4 |
| *r21 = | −20.092 | d21 = | 4.32 | | | | |
| r22 = | −32.691 | d22 = | 5.50 | n12 = | 1.53256 | v12 = | 45.9 |
| r23 = | −9.939 | d23 = | 1.30 | n13 = | 1.77250 | v13 = | 49.6 |
| r24 = | −151.853 | | | | | | |

| Variable | Focal length | |
|---|---|---|
| distance | 36.29 | 193.26 |
| d5 | 1.38 | 22.88 |
| d13 | 19.51 | 1.09 |
| d19 | 7.78 | 4.74 |

| | aspherical coefficients | | | |
|---|---|---|---|---|
| r | A | B | C | D |
| −2.00925D + 01 | 0.00000D + 00 | 1.87375D − 05 | −2.51628D − 08 | −3.22516D − 10 |

As will be appreciated by those of ordinary skill in the art, the following results can be obtained by calculating numerical value data in Numerical Value Examples 1–5 above:

|  | $f_1$ | $f_T$ | $f_1/f_T$ |
|---|---|---|---|
| Example 1 | 63.097 | 193.20 | 0.327 |
| Example 2 | 70.413 | 194.01 | 0.363 |
| Example 3 | 56.56 | 193.10 | 0.293 |
| Example 4 | 56.523 | 193.57 | 0.292 |
| Example 5 | 56.547 | 193.26 | 0.293. |

What is claimed is:

1. A zoom lens comprising, in succession from an object side, a first lens unit of positive refractive power, a second lens unit of negative refractive power, a third lens unit of positive refractive power and a fourth lens unit of positive refractive power, said fourth lens unit having, in succession from the object side, a first positive lens having its convex surface of sharp curvature facing an image plane side, and a cemented lens comprising a meniscus positive lens having its concave surface facing the object side and a negative lens having its concave surface of sharp curvature facing the object side, said meniscus positive lens and said negative lens being cemented together, and wherein for the zooming from the wide angle end to the telephoto end, said first lens unit and said fourth lens unit are moved toward the object side, said second lens unit is moved so that the air gap thereof with respect to said first lens unit monotonically increases and said third lens unit is moved so that the air gap thereof with respect to said second lens unit monotonically decreases.

2. A zoom lens according to claim 1, which satisfies the following conditional expression:

$$0.5<|\phi_C|/\phi_A<1.5,$$

where $\phi_A$ is the refractive power of that lens surface of said first positive lens of said fourth lens unit which faces toward the image plane side, and $\phi_C$ ($\phi_C<0$) is the refractive power of the cemented surface of said cemented lens.

3. A zoom lens according to claim 2, which satisfies the following condition:

$$0.1<N_B-N_A<0.35,$$

where $N_A$ is the refractive index of the positive lens constituting the cemented lens in said fourth lens unit, and $N_B$ is the refractive index of the negative lens constituting the cemented lens in said fourth lens unit.

4. A zoom lens according to claim 1, which satisfies the following conditional expression:

$$0.25<f_1/f_T\leq 0.363$$

where $f_1$ is the focal length of said first lens unit, and $f_T$ is the focal length of the entire system of said zoom lens at the telephoto end.

5. A zoom lens according to claim 1, which satisfies the following conditional expression:

$$0.11<A_2/(A_2-A_1)<0.26,$$

where $A_1$ and $A_2$ are the amounts of movement of said first lens unit and said second lens unit, respectively, resulting from the zooming from the wide angle end to the telephoto end.

6. A zoom lens comprising, in succession from an object side, a first lens unit of positive refractive power, a second lens unit of negative refractive power, a third lens unit of positive refractive power and a fourth lens unit of positive refractive power, and wherein for the zooming from the wide angle end to the telephoto end, said first lens unit and said fourth lens unit are moved toward the object side, said second lens unit is moved so that the air gap thereof with respect to said first lens unit monotonically increases, and said third lens unit is moved so that the air gap thereof with respect to said second lens unit monotonically decreases, and said zoom lens satisfies the following conditional expression:

$$0.25<f_1/f_T<0.363,$$

where $f_1$ is the focal length of said first lens unit, and $f_T$ is the focal length of said zoom lens at the telephoto end, and wherein, in succession from the object side, said first lens unit comprises (i) a cemented lens including a meniscus negative lens having its concave surface facing the image plane side and a biconvex lens, cemented together, said cemented lens being of positive refractive power, and (ii) a meniscus positive lens having its convex surface of sharp curvature facing the object side.

7. A zoom lens according to claim 6, wherein said fourth lens unit has, in succession from the object side, a first positive lens having its convex surface of sharp curvature facing an image plane side, and a cemented lens comprising a meniscus positive lens having its concave surface facing the object side and a negative lens having its concave surface of sharp curvature facing the object side, said meniscus positive lens and said negative lens being cemented together.

8. A zoom lens according to claim 7, which satisfies the following conditional expression:

$$0.5<|\phi_C|/\phi_A<1.5,$$

where $\phi_A$ is the refractive power of that lens surface of said first positive lens of said fourth lens unit which faces toward the image plane side, and $\phi_C$ ($\phi_C<0$) is the refractive power of the cemented surface of said cemented lens of said fourth lens unit.

9. A zoom lens according to claim 8, which satisfies the following condition:

$$0.1<N_B-N_A<0.35,$$

where $N_A$ is the refractive index of the positive lens constituting the cemented lens in said fourth lens unit, and $N_B$ is the refractive index of the negative lens constituting the cemented lens in said fourth lens unit.

10. A zoom lens according to claim 6, which satisfies the following conditional expression:

$$0.11<A_2/(A_2-A_1)<0.26,$$

where $A_1$ and $A_2$ are the amounts of movement of said first lens unit and said second lens unit, respectively, resulting from the zooming from the wide angle end to the telephoto end.

* * * * *

UNITED STATES PATENT AND TRADEMARK OFFICE
CERTIFICATE OF CORRECTION

PATENT NO. : 5,568,321
DATED : October 22, 1996
INVENTOR(S) : OGAWA, ET AL.

It is certified that error appears in the above-indentified patent and that said Letters Patent is hereby corrected as shown below:

COLUMN 3

Line 64, "$100_c$" should read --$\phi_c$--.

COLUMN 4

Line 12, "over" should read --over---.

COLUMN 6

Line 7, "lens unit" should read --lens unit.--.

COLUMN 7

Line 14 (NUMERICAL VALUE EXAMPLE 1), "R4=313.984" should read --R4=35.984--.

COLUMN 8

Line 16 (NUMERICAL VALUE EXAMPLE 1), "$\nu 4=46.0$" should read --$\nu 4=46.6$--.

Line 52 (NUMERICAL VALUE EXAMPLE 2), "N2=1.6516" should read --N2=1.65160--.

UNITED STATES PATENT AND TRADEMARK OFFICE
CERTIFICATE OF CORRECTION

PATENT NO. : 5,568,321
DATED : October 22, 1996
INVENTOR(S) : OGAWA, ET AL.

It is certified that error appears in the above-indentified patent and that said Letters Patent is hereby corrected as shown below:

COLUMN 14

Line 15, "$0.25 < f_1/f_T < 0.363$" should read --$0.25 < f_1/f_T \leq 0.363$--.

Signed and Sealed this

Twenty-fourth Day of June, 1997

Attest:

BRUCE LEHMAN

Attesting Officer

Commissioner of Patents and Trademarks